(12) United States Patent
Ray et al.

(10) Patent No.: US 6,416,932 B1
(45) Date of Patent: Jul. 9, 2002

(54) WATERLESS LITHOGRAPHIC PLATE

(75) Inventors: Kevin Barry Ray, Castleford (GB); Christopher David McCullough, Fort Collins, CO (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

(21) Appl. No.: 09/669,991

(22) Filed: Sep. 26, 2000

Related U.S. Application Data

(63) Continuation of application No. PCT/GB99/00979, filed on Mar. 29, 1999.

(30) Foreign Application Priority Data

Mar. 27, 1998 (GB) .............................. 9806478

(51) Int. Cl.$^7$ ................................ G03F 7/26
(52) U.S. Cl. .................... 430/303; 430/271.1
(58) Field of Search .............. 430/303, 270.1, 430/271.1; 101/467

(56) References Cited

U.S. PATENT DOCUMENTS

| | | | | |
|---|---|---|---|---|
| 3,901,700 A | * | 8/1975 | Yoerger et al. ............... 96/1 R |
| 3,997,349 A | | 12/1976 | Sanders .................. 96/75 |
| 4,486,529 A | | 12/1984 | Jeffers et al. ............ 430/300 |
| 4,724,195 A | * | 2/1988 | Muller et al. ............ 430/192 |
| 5,006,443 A | | 4/1991 | Muller .................. 430/192 |
| 5,085,975 A | * | 2/1992 | Mueller et al. ........... 430/285 |
| 5,104,961 A | * | 4/1992 | Muller et al. ............ 528/129 |
| 5,157,018 A | | 10/1992 | Muller .................. 528/493 |
| 5,200,762 A | | 4/1993 | Katano et al. ............ 346/76 |
| 5,278,126 A | | 1/1994 | Katano et al. ............ 503/201 |
| 5,471,234 A | | 11/1995 | Katano et al. ............ 347/171 |
| 5,705,322 A | | 1/1998 | West et al. .............. 430/325 |
| 6,022,668 A | * | 2/2000 | Burberry et al. .......... 430/302 |
| 6,040,115 A | * | 3/2000 | Bailey et al. ............ 430/303 |
| 6,130,026 A | * | 10/2000 | Bennett et al. ........... 430/303 |
| 6,187,511 B1 | * | 2/2001 | Bennett et al. ........... 430/303 |
| 6,251,559 B1 | * | 6/2001 | Huang et al. ............. 430/270.1 |

FOREIGN PATENT DOCUMENTS

| | | |
|---|---|---|
| DE | 2648278 | 5/1977 |
| DE | 4010275 | 10/1990 |
| EP | 164059 | 12/1985 |
| EP | 557138 | 8/1993 |
| EP | 706899 | 4/1996 |
| GB | 1563607 | 3/1980 |
| JP | 01056714 | 3/1989 |
| JP | 01144411 | 6/1989 |
| WO | WO 9707430 | 2/1997 |
| WO | WO 9901795 | 1/1999 |
| WO | WO 9911458 | 3/1999 |
| WO | WO 99/14048 | * 3/1999 |
| WO | WO 9921725 | 5/1999 |

* cited by examiner

*Primary Examiner*—Janet Baxter
*Assistant Examiner*—Barbara Gilmore
(74) *Attorney, Agent, or Firm*—Baker Botts L.L.P.

(57) ABSTRACT

A method of producing a resist pattern on a substrate using a precursor which comprises a coating composition which includes a heat sensitive polymeric substance having functional groups Q thereon (wherein groups Q may be siloxane or optionally substituted fluoroalkyl groups) wherein groups Q cause the polymeric substance to have a reduced adhesive interaction with ink for use in waterless lithographic printing compared to aid polymeric substance in the absence of said groups, the method including the step of causing the patternwise application of heat to said coating composition and optional development thereby to define ink accepting areas in heat exposed areas and non-ink accepting areas in non-exposed areas.

14 Claims, No Drawings

WATERLESS LITHOGRAPHIC PLATE

CROSS-REFERENCE TO RELATED APPLICATIONS

This application is a continuation of and claims priority from International Application Serial No. PCT/GB99/00979 which was published in English on Oct. 7, 1999, and which in turn claims priority from GB Application No. 9806478.5.

BACKGROUND OF THE INVENTION

1. Field of the Invention

This invention relates to pattern formation and particularly, although not exclusively, relates to pattern-forming methods, precursors for use in such methods and novel polymeric substances and formulations for use in such methods. Preferred embodiments relate to the preparation of printing members, especially planographic (eg. lithographic) printing members.

2. Background Information

The art of lithographic printing is based on the immiscibility of ink, generally an oily formulation, and water, wherein in the traditional method the ink is preferentially retained by the image or pattern area and the water or fountain solution is preferentially retained by the non-image or non-pattern area. When a suitably prepared surface is moistened with water and an ink is then applied, the background or non-image area retains the water whilst the image area accepts ink and repels the water. The ink on the image area is then transferred to the surface of a material upon which the image is to be reproduced, such as paper, cloth and the like. Commonly the ink is transferred to an intermediate material called the blanket which in turn transfers the ink to the surface of the material upon which the image is to be reproduced.

New types of "waterless" lithographic printing employ only an oily ink material and preferentially ink-accepting image areas and ink-repelling non-image areas on the printing form.

There are a number of different types of waterless lithographic printing form precursors (by which we mean a coated printing form prior to exposure and optional development). A first type may comprise an oleophilic base having thereon a radiation sensitive coating which when imagewise exposed to radiation of a suitable wavelength hardens in the exposed areas. On development, the non-exposed areas of the coating are removed leaving the image. A second type may comprise an oleophobic base having thereon a radiation sensitive coating which after imagewise exposure has exposed areas which are more soluble in a developer than non-exposed areas. In this case, therefore, non-exposed areas define the image and exposed areas are removed. In both the first and second types, the coating which defines the image is non-ink-accepting (oleophobic) and the base is ink-accepting (oleophilic). In other arrangements, the base may be oleophobic and the coating may be oleophilic.

In a third type of printing form, exposed areas of a radiation sensitive coating on a support are rendered more ink receptive (oleophilic) than non-exposed areas by the exposure process alone (i.e. without a development step) and this differentiation is sufficient to enable the form to be used in printing. In another example of the third type, exposed and non-exposed areas may be oleophobic and oleophilic respectively.

The photoresists used in pattern forming methods for electronic parts such as printed circuits may comprise radiation sensitive coatings of either the first or second types described above. After exposure to radiation and development, the remaining coating acts as a mask for forming the patterns onto the underlying electronic elements—for example by etching an underlying copper foil. Due to the high resolution demands and the requirements of high resistance to etching techniques, compositions of the second type described above are widely used. In particular, there have in the main been used alkali developable compositions of alkali-soluble novolak resins as disclosed in J. C. Streiter, Kodak Microelectronics Seminar Proceedings, 1979, p. 116. The primary active component of such compositions, both in the context of lithographic printing forms and electronic parts, is a naphthoquinonediazide (NQD) derivative.

The types of electronic parts whose manufacture may use a photo resist include printed wiring boards (PWBs), thick- and thin-film circuits, comprising passive elements such as resistors, capacitors and inductors; multichip devices (MDCs); and integrated circuits (ICs). These are all classified as printed circuits.

It is an object of the present invention to address problems associated with pattern formation.

SUMMARY OF THE INVENTION

This invention is directed to a method of producing a member comprising a predetermined pattern on a substrate. The method comprises: (a) providing a precursor comprising a substrate on which is provided a coating composition which includes a functionalized polymeric substance having functional groups Q thereon wherein said functionalized polymeric substance is heat sensitive and said functional groups Q thereon cause said polymeric substance to have a reduced adhesive interaction with ink for use in waterless lithographic printing compared to said polymeric substance in the absence of said groups Q, and (b) causing the pattern-wise application of heat to said coating composition and optional development thereby to define ink-accepting areas in heat exposed areas and non-ink-accepting areas in non-exposed areas. In a preferred embodiment, the member is a waterless printing member. The functionalized polymeric substance is preferably obtained from the reaction product of an esterification reaction between a polymeric substance having functional groups A thereon and a compound BQ wherein groups A and B react to form a ester group.

DETAILED DESCRIPTION OF THE INVENTION

According to a first aspect of the present invention, there is provided a method of producing a member comprising a predetermined pattern on a substrate, the method using a precursor comprising said substrate on which is provided a coating composition which includes a polymeric substance having functional groups Q thereon (hereinafter "said functionalized polymeric substance") wherein said functionalized polymeric substance is heat sensitive and said functional groups Q thereon cause said polymeric substance to have a reduced adhesive interaction with ink for use in waterless lithographic printing compared to said polymeric substance in the absence of said groups Q, the method including the step of causing the pattern-wise application of heat to said coating composition and optional development thereby to define ink-accepting areas in heat exposed areas and non-ink-accepting areas in non-exposed areas.

Preferably, said functional groups Q on said polymeric substance cause said functionalized polymeric substance to be heat-sensitive. Said polymeric substance (in the absence of said groups Q) may not be heat sensitive.

A preferred embodiment of the present invention provides a method of producing a waterless printing member, the method using a precursor comprising a substance on which is provided a coating composition which includes a polymeric substance having functional groups Q thereon (hereinafter "said functionalized polymeric substance") wherein said functionalized polymeric substance is heat sensitive and said functional groups Q thereon cause said functionalized substance to have a reduced adhesive interaction with ink for use in waterless lithographic printing compared to said polymeric substance in the absence of said groups Q, the method including the step of causing the pattern-wise application of heat to said coating composition and optional development thereby to define ink-accepting areas in heat exposed areas and non-ink-accepting areas in non-exposed areas.

Said functionalized polymeric substance preferably has the property that it is non-ink-accepting (or adhesive) to ink for use in waterless lithographic printing prior to application of heat and ink-accepting (or adhesive) to ink for use in waterless lithographic printing after application of heat.

Said functionalized polymeric substance preferably has the property that it is developer insoluble prior to the delivery of heat and developer soluble thereafter.

Preferably, said functional groups Q on said polymeric substance cause said functionalized polymeric substance to have the property that it is developer insoluble prior to the delivery of heat and developer soluble thereafter. Preferably, said polymeric substance (in the absence of said groups Q) is developer soluble.

The method may include an optional development step for removing heat-exposed areas of said composition. Said development step may comprise contacting said coating with a selected developer.

In this specification, when we state that a composition is developer soluble, we mean that it is soluble in a selected developer to an extent useful in a lithographic printing form development process and/or an electronic part photoresist development process and/or in a process for the preparation of a mask for use in the preparation of a flexographic printing plate. When we state that a composition is developer insoluble, we mean that it is not soluble in the selected developer to an extent useful in the aforementioned processes.

Where reference is made herein to the use of a developer, it will be appreciated that the nature of the developer will depend on the nature of a composition to be developed. The developer is, however, preferably an aqueous composition. Common components of aqueous developers are surfactants, chelating agents such as salts of ethylenediamine tetraacetic acid, organic solvents such as benzyl alcohol, and alkaline components such as inorganic metasilicates, organic metasilicates, hydroxides or bicarbonates.

Preferably the aqueous developer is an alkaline developer containing inorganic or organic metasilicates when the polymeric substance is a phenolic resin, as is preferred.

Said pattern on said substrate suitably comprises areas of material which have different properties compared to the properties of adjacent areas. For example, said pattern may comprise areas of material which have a reduced adhesive interaction with ink for use in waterless lithographic printing compared to the adhesive interaction with such ink by said adjacent areas. Thus, where a waterless lithographic printing member is produced in the method said areas which have a reduced interaction may comprise non-printing areas, whereas adjacent areas may pick-up waterless lithographic ink and thereby define printing areas. In some cases, said adjacent areas may comprise a surface of said substrate (when said coating composition is removed, for example by development, from heated areas) whereas, in other cases, said adjacent areas may comprise said coating composition which has been modified by application of heat.

Preferably, said functional groups Q do not contain a naphthoquinone diazide (NQD) group. More preferably, said functional groups Q do not contain NQD or a benzoquinone diazide (BQD) group. Especially preferred is the case wherein said functional groups Q do not contain any diazide group.

Preferably, said functionalized polymeric substance does not contain a NQD group. More preferably, said polymeric substance does not contain a NQD or BQD group. Especially preferred is the case wherein said polymeric substance does not contain any diazide group.

Preferably, said functional groups Q are not primarily responsible for the absorbtion of heat.

Preferably, said heat sensitive composition does not produce a gas on application of heat.

Preferably, said polymeric substance (in the absence of said groups Q) is significantly more soluble in a selected developer than said functionalized polymeric substance. Preferably, in practical terms, said substance in the absence of groups Q may be regarded as a soluble polymeric substance.

Although the invention is not limited in respect of the manner in which the groups Q are bonded to the polymeric substance, preferably a said corresponding unfunctionalized polymeric substance has hydroxy groups, which can be functionalized by the groups Q. Preferably, said functionalized polymeric substance retains some hydroxy groups. That is, the functional groups Q may covalently bond to the polymeric substance through reaction with hydroxy groups thereof, but preferably not all of the hydroxy groups are thereby reacted.

Preferably, the ratio of functional groups Q in the functionalized polymeric substance to hydroxy groups in the corresponding unfunctionalized polymeric substance is in the range 1:100 to 1:2. More preferably the said functional group ratio is in the range 1:50 to 1:3. Most preferably the said functional group ratio is in the range 1:20 to 1:6.

Examples of suitable polymeric substances may be selected from phenolic resins, styrenes, for example 4-hydroxystyrene, 3-methyl-4-hydroxystyrene and 4-methoxystyrene, acrylic acids, for example, methacrylic acid and acrylic acid, maleiimide, maleic acid and maleic acid anhydride, in each case, as homopolymers, co-polymers or terpolymers.

Instead of hydroxy groups the unfunctionalized polymeric substance may comprise thiol groups which can likewise be functionalized. However hydroxy groups are preferred for functionalisation.

Most preferably, said unfunctionalized polymeric substance is a phenolic resin. Particularly useful phenolic resins are the condensation products from the interaction between phenol, C-alkyl substituted phenols (such as cresols and p-tert-butyl-phenol), diphenols (such as bisphenol-A) and aldehydes (such as formaldehyde). Dependent on the preparation route for the condensation a range of phenolic materials with varying structures and properties can be formed. Particularly useful in this invention are novolak resins, resole resins and novolak/resole resin mixtures. Examples of suitable novolak resins have the following general structure

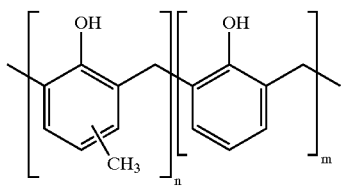

Preferably, there is hydrogen bonding between said functional groups Q and other groups of the same molecule or other molecule(s) of said functionalized polymeric substance and/or of said coating composition. Suitable moieties known to favour hydrogen bonding and which may be a component of said functional groups Q may include amino, monoalkylamino, dialkylamino, amido, monoalkylamido, dialkylamido, chloro, fluoro, carbonyl, sulphinyl and sulphonyl moieties. Especially preferred moieties of groups Q are fluoro moieties.

Said functional groups Q may include siloxane or optionally-substituted fluoroalkyl moieties.

A preferred siloxane is an organosiloxane, with a dialkyl, for example a di($C_{1-6}$)alkyl siloxane being especially preferred. A commercially available siloxane which may be used in the preparation of said functionalized polymer is PS44 which is a vinyl-terminated polydimethylsiloxane obtained from Petrarch Systems Inc of Bristol, U.S.A.

Preferably, functional groups Q include optionally substituted fluoroalkyl moieties.

Preferred fluoroalkyl groups are saturated and include at least 4, preferably at least 8, especially at least 12, fluorine atoms, suitably linked to carbon atoms.

Preferred fluoroalkyl groups may have at least 2, suitably at least 3, preferably at least 4, more preferably at least 5, especially at least 6 carbon atoms. Preferred fluoroalkyl groups may have less than 20, suitably less than 18, preferably less than 16, more preferably less than 14, especially less than 12 carbon atoms.

Preferably, functional groups Q include an optionally-substituted, especially an unsubstituted, perfluoroalkyl group. Preferred perfluoroalkyl groups are linear.

A preferred functionalized polymeric substance for use in the method may be defined by a formula $R(Q)_n$ where. R represents a polymer chain of the polymeric substance, Q represents functional groups bonded thereto and n is an integer.

Preferably, Q represents a group of formula -TZ where T is a linking atom or group and Z is a siloxane or an optionally-substituted fluoroalkyl moiety as described above.

Group T may be selected from any of the following, wherein the right hand end of the moiety is bonded to group Z
—OOC($CH_2)_a$—
—O—$CR^2$H—COO($CH_2)_a$—
—OOC—$C_bH_{2b}$—O($CH_2)_a$—
—COO($CH_2)_a$—
—OOC—$C_bH_{2b}$—COO($CH_2)_a$—
—$NHSO_2(CH_2)_a$—
—OOC—CH=CH—COO($CH_2)_a$—
—$NHSO_2C_6H_4$—
—OC($CH_2)_a$—
—NHCO($CH_2)_a$—
—$SO_3$—($CH_2)_a$—
—NHCO—$C_bH_b$—COO($CH_2)_a$—
—$SO_3C_6H_4$—
—NHCO—CH=CH—COO($CH_2)_a$—

One group Q may be covalently bonded to the polymeric substance at more than one site thereof, to form a cyclic structure. For example Q may be a group of formula —O—X(Z)—O— where X represents a linking moiety and Z represents a further moiety. This may occur, for example, in certain phosphorus-modified novolak resins, produced by reaction with phosphoric acids or phosphorous oxyhalides.

Preferably, said group T includes a terminal moiety —O—$T^1$— wherein the oxygen atom is bonded to the polymeric substance and $T^1$ represents a carbonyl group, a sulphinyl group or a sulphonyl group.

Group T may be represented by the general formula —O—$T^1$—($CH_2)_m$— wherein the right hand end of the moiety is bonded to the group Z and wherein m may represent 0 to 12, suitably 0 to 10, preferably 0 to 7, more preferably 0 to 3. Especially preferred is the case wherein m represents 0.

Preferably, $T^1$ represents a carbonyl group.

In certain embodiments described above, it has been stated that it is preferred that functional groups Q do not contain an NQD and/or BQD and/or any diazide groups. However, the presence of NQD and/or BQD and/or diazide groups additional to the functional groups Q is not excluded from the above definitions of the invention. Preferably, however, said functionalized polymeric substance does not include a NQD group, more preferably does not include a NQD or BQD group and, especially, does not contain any diazide group. Also, the presence in said composition of simple NQD and/or BQD or other diazide compounds, is not excluded from the above definitions of the invention.

In addition to the functionalized polymeric substance having functional groups Q thereon, the coating composition may contain an additional polymeric substance or substances. Such may be regarded as "inactive", in having a given level of inherent developer solubility and not being functionalized to alter that inherent developer solubility, or may be regarded as an additional "active" polymeric substance or substances, including for example a NQD resin ester. In such a composition having a blend of polymeric substances it should be noted that said functionalized polymeric substance(s) can be present in a lower amount, by weight, than the other polymeric substance(s).

In some cases, a polymeric release material or other material which is adhesive (or non-ink-accepting) to waterless lithographic ink may be included in said coating composition in order to affect the oleophobicity of the coating.

The functionalized polymeric substance(s) may be present in an amount of at least 10%, suitably at least 20%, preferably at least 30%, more preferably at least 45%, especially at least 60% by total weight of the polymeric substances present in the composition. In the most preferred embodiments, said functionalized polymeric substance(s) may be present in an amount of at least 75%, especially at least 90%, of the total weight of the polymeric substances present in the composition.

It should be noted that the quantitative definitions presented above are typical ranges, and that the precise selection will depend on the particular circumstances. For example the selection of highly effective functional groups Q may mean that a blend of polymeric substances may be used, with the functionalized polymeric substance(s) being in relatively low proportion; and/or that the aforesaid functional group ratio may be lower than if a less effective functional group had been selected. The pattern-forming conditions selected and the developer to be used will also be of relevance. The selection of a higher functional group ratio may mean that a lesser amount of functionalized polymeric substance(s) may be employed; an inherently more soluble unfunctionalized polymeric substance may mean that a weaker developer can be used (to environmental advantage), or a lesser delivery of radiation, or a lower functional group ratio, or a faster processing speed either in terms of radiation delivery or development time, or both. There are thus several composition, imaging and developing variables which can be employed to advantage for a given application.

Said functionalized polymeric substance(s) may represent at least 10 wt %, suitably at least 20 wt %, preferably at least 30 wt %, more preferably at least 45 wt %, especially at least 60 wt % of the total weight of said coating on said substrate. In the most preferred embodiments, said functionalized polymeric substance(s) may represent at least 75 wt %, especially at least 85 wt % of the total weight of said coating composition on said substrate.

In broad terms, the patternwise application of heat to said coating composition may be accomplished in one of the following ways:

the direct delivery of heat by a heated body, by conduction. For example the composition may be contacted by a heat stylus; or the reverse face of a support surface onto which the composition has been coated may be contacted by a heat stylus.

the use of incident electromagnetic radiation to expose the composition, the electromagnetic radiation being converted to heat, either directly or by a chemical reaction undergone by a component of the composition. The electromagnetic radiation could for example be infrared, UV or visible radiation.

the use of charged-particle radiation, for example electron beam radiation. Clearly, at the fundamental level the charged-particle mode and the electromagnetic mode are convergent; but the distinction is clear at the practical level.

In order to increase the sensitivity of the coating composition, it is beneficial in embodiments using electromagnetic radiation to include an additional component, namely a radiation absorbing compound capable of absorbing the incident electromagnetic radiation and converting it to heat (hereinafter called a "radiation absorbing compound"). It may also be desirable to include such a compound in a method using charged particle radiation.

Coating compositions intended to require infra-red radiation for patternwise exposure may be exposed directly by means of a laser. Preferably the laser emits radiation at above 600 nm. For such compositions a suitable radiation absorbing compound, to convert the infra-red radiation to heat, may usefully be a black body radiation absorber, such as carbon black or graphite. It may be a commercially available pigment such as Heliogen Green as supplied by BASF or Nigrosine Base NG1 as supplied by NH Laboratories Inc or Milori Blue (C.I. Pigment Blue 27) as supplied by Aldrich.

In preferred methods of the invention, the composition is imagewise exposed directly by a laser. Most preferably the laser emits radiation at a wavelength above 600 nm and the radiation absorbing, compound is usefully an infra-red absorbing dye.

Examples of lasers which can be used in the method of the present invention include semiconductor diode lasers emitting at between 600 nm and 1200 nm. An example is the Nd YAG laser which emits at 1064 nm, but any laser of sufficient imaging power and whose radiation can be absorbed by the composition, can be used.

Preferably the infra-red absorbing compound is one whose absorption spectrum is significant at the wavelength output of the laser which may be used in the method of the present invention. Usefully it may be an organic pigment or dye such as phthalocyanine pigment. Alternatively it may be a dye or pigment of the squarylium, merocyanine, cyanine, indolizine, pyrylium or metal dithioline classes.

In compositions intended to require infra-red radiation for patternwise exposure it is preferred that their developer solubility is not increased by incident UV or visible radiation, so making handling of the compositions straightforward. Preferably such compositions do not comprise any UV or visible light sensitive components. However UV or visible light sensitive components which are not activated by UV or visible light due to the presence of other components, such as UV or visible light absorbing dyes or a UV or visible light absorbing topmost layer, may be present.

In compositions intended to require UV radiation for patternwise exposure the composition may contain any radiation absorbing compound able to convert incident UV radiation to heat. Suitable radiation absorbing compounds include black body radiation absorbers, for example carbon black or graphite, and latent Bronsted acids, including onium salts and haloalkyl-substituted S-triazines, as described in U.S. Pat. Nos. 5,491,046 and 4,708,925. The relevant lists of UV absorbing compounds in these patents are incorporated herein by reference. Diazide derivatives may also be employed, within the definitions of the invention given herein. It should be noted that the function of such compounds when present in the composition will not be primarily to bring about the radiation-induced solubility change; it is primarily the functional groups Q of the functionalized polymeric substance which do that.

In the method, said precursor may be heat imaged indirectly by exposure to a short duration of high intensity radiation transmitted or reflected from the background areas of a graphic original located in contact with the precursor. Alternatively, it may be patternwise heated using a heated body. For example, the reverse face of a support surface, onto the front face of which the coating is provided may be contacted by a heat stylus. Alternatively, the coating itself may be contacted by a heat stylus. Most preferred, however, is the case wherein said precursor is exposed to direct heat, using a laser as described above.

Suitably, the radiation absorbing compound, when present, constitutes at least 0.5 wt %, preferably at least 1 wt %, more preferably at least 2 wt %, especially at least 3 wt % of the total weight of the composition. Suitably, the radiation absorbing compound, when present, constitutes less than 20 wt %, preferably less than 15 wt %, more preferably less than 10 wt %, especially less than 5 wt % of the total weight of the composition. There may be more than one radiation absorbing compound. References herein to the amount of such compound(s) are to their total content.

The compositions used in the invention may contain other ingredients such as stabilising additives, inert colorants, and additional inert polymeric binders.

Preferably, said coating composition does not include an NQD compound, more preferably does not include an NQD or BQD compound and, especially, does not include any diazide compound.

The major proportion of the coating composition is preferably constituted by polymeric substance(s), including the "active" polymeric substance(s) and, when present, "inactive" polymeric substance(s). Preferably a minor proportion of the composition is constituted by additional components, when present at all.

A major proportion as defined herein is suitably at least 50%, preferably at least 65%, most preferably at least 80%, of the total weight of the composition.

A minor proportion as defined herein is suitably less than 50%, preferably up to 20%, most preferably up to 15%, of the total weight of the composition.

In one preferred embodiment of the invention said precursor may include an additional layer comprising a radiation absorbing compound. This multiple layer construction can provide routes to high sensitivity as larger quantities of absorber can be used without affecting the function of the pattern forming layer. In principle any radiation absorbing material which absorbs sufficiently strongly in the desired band can be incorporated or fabricated in a uniform coating. Dyes, metals and pigments (including metal oxides) may be used in the form of vapour deposited layers. Techniques for the formation and use of such films are well known in the art, for example as described in EP 0,652,483.

Said substrate on which is provided said coating composition may comprise any suitable support used in the manufacture of printing members, for example lithographic printing member, masks for use in flexographic plate manufacture or electronic parts.

Said support may be arranged to be ink-accepting when for use in waterless lithographic printing.

Said support may comprise a metal layer. Preferred metals include aluminium, zinc and titanium, with aluminium being especially preferred. Said support may comprise an alloy of the aforesaid metals. Other alloys that may be used include brass and steel, for example stainless steel.

Said support may comprise a non-metal layer. Preferred non-metal layers include layers of plastics, paper or the like. Preferred plastics include polyester, especially polyethylene terephthlate.

Said support may comprise any type of support usable in printing. For example, it may comprise a cylinder or, preferably, a plate.

Said precursor of said first aspect may be for the manufacture of an electronic part. The types of electronic parts whose manufacture may use a heat sensitive coating include printed wiring boards (PWBs), thick- and thin-film circuits, comprising passive elements such as resistors, capacitors and inductors; multichip devices (MDCs); integrated circuits (ICs); and active semi-conductor devices. The electronic parts may suitably comprise conductors, for example copper boards; semi-conductors, for example silicon or germanium; and insulators, for example silica as a surface layer with silicon beneath, with the silica being selectively etched away to expose portions of the silicon beneath (a step in the manufacture of e.g. field effect transistors).

A preferred functionalized polymeric substance according to the present invention passes at least Test 1 described below, and preferably passes Tests 1 and 2. Additionally, it preferably passes Tests 3 or 4. Most preferably, it passes all of the Tests.

Test 1

Said polymeric substance in the absence of said groups Q is coated on a support and dried. Then the surface is inked up using a waterless lithographic ink and the level of ink-acceptance assessed. Then a said polymeric substance having said groups Q thereon is coated onto a support in the same way, and then inked up and assessed. If the substance in the absence of said groups Q is substantially ink-accepting and said substance having groups Q is substantially non-ink-accepting, then said polymeric substance having groups Q thereon passes the test.

Test 2

A support coated with said functionalized polymeric substance is heated, for example in an oven or by contact with a heated body, such that the substance reaches a suitable temperature for an appropriate period of time. Then it is optionally processed in a selected developer as described herein. The surface is dried (if necessary) and inked up using a waterless lithographic ink. If the surface is substantially ink-accepting, the polymeric substance passes the test.

Test 3

A support coated with said functionalized polymeric substance is exposed to UV light for 30 seconds and then inked-up using a waterless lithographic ink. If the surface is substantially non-ink accepting, then the functionalized polymeric substance passes the test.

Test 4

A support coated with said functionalized polymeric substance is exposed to UV light for 30 seconds and then processed in an aqueous developer comprising 7 wt % sodium metasilicate at ambient temperature. The surface is then dried and inked up using a waterless lithographic ink. If the surface is substantially non-ink-accepting, then the functionalized polymeric substance passes the test.

According to a second aspect of the invention, there is provided a precursor for use in a method according to said first aspect, said precursor comprising a substrate on which is provided a coating composition which includes a polymeric substance having functional groups Q thereon (hereinafter "said functionalized polymeric substance") wherein said functionalized polymeric substance is heat sensitive and said functional groups Q thereon cause said polymeric substance to have a reduced adhesive interaction with ink for use in waterless lithographic printing compared to said polymeric substance in the absence of said groups Q.

Said precursor is preferably arranged to produce a predetermined pattern on said substrate by patternwise application of heat to said coating composition. Said precursor is preferably arranged such that after patternwise application of heat and optional development ink-accepting areas are defined in heat-exposed areas and non-ink-accepting areas are defined in non-exposed areas.

In accordance with another aspect of the invention, there is provided a member comprising a predetermined pattern on a substrate, the member being produced in a method according to said first aspect and/or using a precursor according to said second aspect.

The invention extends to a method of preparing a polymeric substance having functional groups Q thereon as described above, the method comprising an esterification reaction between a polymeric substance having functional groups A thereon and a compound BQ wherein groups A and B can react to form an ester group.

Preferably, A and B are selected from —SH, —OH and a group of formula —CO—OL where L represents a leaving group, suitably selected from a halogen, especially a chlorine, atom, —NH$_2$ and —OH. More preferably, A represents —OH and B represents —COCl.

The invention further extends to any novel polymeric substance having groups Q thereon as described herein.

The invention yet further extends to any novel heat sensitive composition as described herein.

Any feature of any aspect of any invention or embodiment described herein may be combined with any feature of any aspect of any other invention or embodiment described herein.

Specific embodiments of the invention will now be described, by way of example.

The following products are referred to hereinafter:

LB6564—a 1:1 phenol/cresol novolak resin supplied by Bakelite, U.K.

Pentadecafluorooctanoyl chloride—supplied by Aldrich of Dorset, England.

KF654B—a dye supplied by Riedel de Haan, U.K., believed to have the structure:

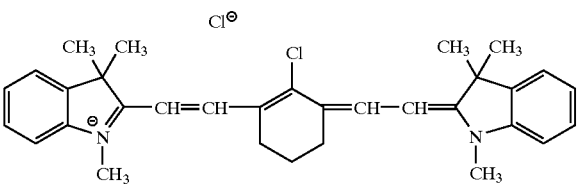

Creo Trendsetter—refers to a Creo Trendsetter 3244 using Procomm Plus software, operating at a wavelength of 830 nm at powers of up to 8 W and supplied by Creo Products Inc, Burnaby, Canada.

Goldstar Developer—A developer comprising 14 wt % sodium metasilicate in water, obtained from Horsell Graphic Industries Limited, Morely, England.

Sahara M/C black waterless ink—a waterless ink obtained from Classic Colours, Berkshire, U.K.

EXAMPLE 1
Preparation of Esterfied Resin

LB6564 resin (19.4 g, 0.0858 mole) and pentadecafluorooctanoyl chloride (24.7 g, 0.0572 mole) were dissolved in 1,4-dioxane (175 g). Over a period of 1 hour, triethylamine (6.4 g, 0.0629 mole) dissolved in 1,4-diozane (47 g) was added dropwise with stirring and ice cooling to ensure that the maximum temperature of the reaction mixture did not exceed 25° C. The reaction mixture was stirred for a further four hours at ambient temperature. After this time, the reaction mixture was filtered to remove the precipitated triethylamine hydrochlride by-product. The remaining resin solution was then precipitated into 4 liters of ice-water which was maintained at approximately pH 3 using hydrochloric acid. The precipitated resin was filtered off, washed with water and dried in a fan oven at 30° C. for 24 hours. The reaction yield was 38%.

The resin obtained was characterised using FT-IR spectroscopy. The resultant spectra showed the presence of a carbonyl group conjugated with an aromatic ring and also the presence of the C—F group. This confirms that the reaction was successful.

| Group | Wavenumber/cm$^{-1}$ | Type |
|---|---|---|
| C=O (conjugated with an aromatic ring) | 1,793 | Strong stretch |
| C—F | 1,148 | Strong stretch |

EXAMPLE 2
Preparation of Coated Substrate

A solution was prepared by barrel rolling LB6564 ester prepared in Example 1 (15.0 wt %), KF654B dye (0.5 wt %) and 1,4-dioxane (84.5 wt %) for 24 hours.

The solution was coated onto a standard electrograined and anodised aluminium substrate using a Meyer bar and dried in an oven at 100° C. for 1 minute to give a dry film weight of 1.5–2.0 gm$^{-2}$.

EXAMPLE 3
Imaging

Two plates (plates A and B) were imaged using the Creo Trendsetter at 200 mJcm$^{-2}$ with a series of 10 cm width horizontal stripes. Directly after imaging, the pattern was visible by way of a colour change from bright green to grey.

EXAMPLE 4
(Optional) Development

Plate A was hand-developed using Goldstar developer for 60 seconds, rinsed with water and dried. This resulted in exposure of the substrate in imaged areas whereas non-imaged areas were composed of LB6564 ester and KF654B dye.

Plate B was left undeveloped.

EXAMPLE 5
Inking 0.4 to 0.5 g of conventional air drying black waterless lithographic printing ink (Sahara M/C) was applied to an area of glass plate 15 cm by 20 cm in size. This was rolled into a uniform film using a rubber roller. Plates A and B were then inked using several passes from the inked roller. The test was deemed a success if the ink adhered to the imaged areas significantly more than to non-imaged areas.

Results

It was found that, with both Plate A and Plate B, the imaged areas picked up the ink but the non-imaged areas repelled the ink.

It was observed that Plate B (which was undeveloped) showed a much better contrast between the ink pick-up abilities of exposed and non-exposed areas than Plate A—that is, Plate B performed better than Plate A.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A method of producing a member comprising a predetermined pattern on a substrate, the method comprising: (a) providing a precursor comprising a substrate on which is provided a coating composition which includes a functionalized polymeric substance which is a phenolic resin having functional groups Q thereon wherein said functionalized polymeric substance is heat sensitive and said functional groups Q thereon cause said functionalized polymeric substance to have a reduced adhesive interaction with ink for use in waterless lithographic printing compared to the phenolic resin in the absence of said groups Q and (b) causing the pattern-wise application of heat to said coating composition and optional development thereby to define ink-accepting areas in heat exposed areas and non-ink-accepting areas in non-exposed areas, wherein the coating composition has a developer solubility which is not increased by incident UV or visible radiation.

2. A method of producing a waterless printing member, the method comprising: (a) providing a precursor comprising a substrate on which is provided a coating composition which includes a functionalized polymeric substance which is a phenolic resin having functional groups Q thereon wherein said functionalized polymeric substance is heat sensitive and said functional groups Q thereon cause said functionalized substance to have a reduced adhesive interaction with ink for use in waterless lithographic printing compared to the phenolic resin in the absence of said groups Q, and (b) causing the pattern-wise application of heat to said coating composition and optional development theory to define ink-accepting areas in heat exposed areas and non-ink-accepting areas in non-exposed areas, wherein the coating composition has a developer solubility which is not increased by incident UV or visible radiation.

3. The method according to claim 1 or claim 2, wherein said functionalized polymeric substance has the property that it is non-ink-accepting or adhesive to ink for use in waterless lithographic printing prior to application of heat and ink-accepting or adhesive to ink for use in waterless lithographic printing after application of heat.

4. The method according to claim 1 or claim 2, wherein said functionalized polymeric substance is developer insoluble prior to the delivery of heat and developer soluble thereafter.

5. The method according to claim 1 or claim 2, wherein said functional groups Q do not contain a naphthoquinone diazide group.

6. The method according to claim 1 or claim 2, wherein said functional groups Q include siloxane or optionally-substituted fluoroalkyl groups.

7. The method according to claim 6, wherein said fluoroalkyl groups are saturated and include at least 4 fluorine atoms linked to carbon atoms and include at least 2 and less than 20 carbon atoms.

8. The method according to claim 1 or claim 2, wherein said functional groups Q include an optionally-substituted perfluoroalkyl group.

9. The method according to claim 1 or claim 2, wherein Q represents a group of formula—TZ where T is a linking atom or group and Z is a siloxane or an optionally-substituted fluoroalkyl moiety.

10. The method according to claim 9, wherein said group T includes terminal moiety —O—T'— wherein the oxygen atom is bonded to the polymeric substance and T' represents a carbonyl group, a sulphinyl group or a sulphonyl group.

11. The method according to claim 1 or claim 2, wherein said composition is pattern-wise exposed directly by a laser which emits radiation at a wavelength above 600 nm.

12. The method according to claim 1 or claim 2, wherein said coating composition includes a radiation absorbing compound to convert radiation to heat.

13. The method according to claim 1 or claim 2, wherein said coating composition does not include a naphthoquinone diazide compound.

14. A member comprising a predetermined pattern on a substrate, the member being produced by the method comprising: (a) providing a precursor comprising a substrate on which is provided a coating composition which includes a functionalized polymeric substance which is a phenolic resin having functional groups Q thereon wherein said functionalized polymeric substance is heat sensitive and said functional groups Q thereon cause said functionalized polymeric substance to have a reduced adhesive interaction with ink for use in waterless lithographic printing compared to the phenolic resin in the absence of said Q groups, and (b) causing the pattern-wise application of heat to said coating composition and optional development thereby to define ink-accepting areas in heat exposed areas and non-ink-accepting areas in non-exposed areas, wherein the coating composition has a developer solubility which is not increased by incident UV or visible radiation.

* * * * *

UNITED STATES PATENT AND TRADEMARK OFFICE
CERTIFICATE OF CORRECTION

PATENT NO.    : 6,416,932 B1
DATED         : July 9, 2002
INVENTOR(S)   : Ray et al.

It is certified that error appears in the above-identified patent and that said Letters Patent is hereby corrected as shown below:

Title page,
Item [57], ABSTRACT,
Line 8, "aid" should read -- said --

Column 1,
Line 17, "eg." should read -- e.g., --

Column 2,
Line 10, "novolak" should read -- novolac --
Line 45, "a" should read -- an --

Column 3,
Line 20, "adhesive" should read -- abhesive --

Column 4,
Line 21, "absorbtion" should read -- absorption --
Line 51, "maleiimide" should read -- maleimide --
Line 67, "novolak" should read -- novolac --

Column 5,
Lines 1 and 2, "novolak" should read -- novolac --

Column 6,
Line 10, "novolak" should read -- novolac --

Column 7,
Line 62, "absorbing," should read -- absorbing --

Column 9,
Line 35, "terephthlate" should read -- terephthalate --

UNITED STATES PATENT AND TRADEMARK OFFICE
CERTIFICATE OF CORRECTION

PATENT NO. : 6,416,932 B1
DATED : July 9, 2002
INVENTOR(S) : Ray et al.

It is certified that error appears in the above-identified patent and that said Letters Patent is hereby corrected as shown below:

<u>Column 11,</u>
Line 2, "novolak" should read -- novolac --
Line 32, "1,4-diozane" should read -- 1,4-dioxane --
Line 39, "hydrochlride" should read -- hydrochloride --

<u>Column 13,</u>
Line 21, "theory" should read -- thereby --

Signed and Sealed this

Eleventh Day of February, 2003

JAMES E. ROGAN
*Director of the United States Patent and Trademark Office*